Sept. 1, 1936.  F. I. GETTY  2,053,187

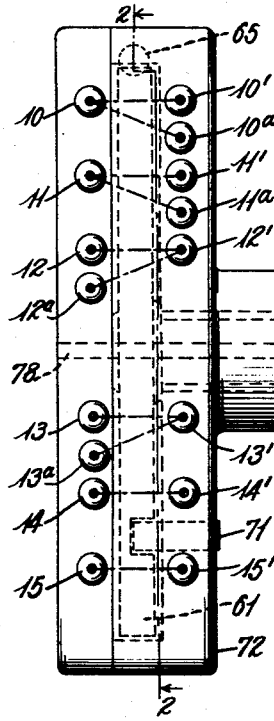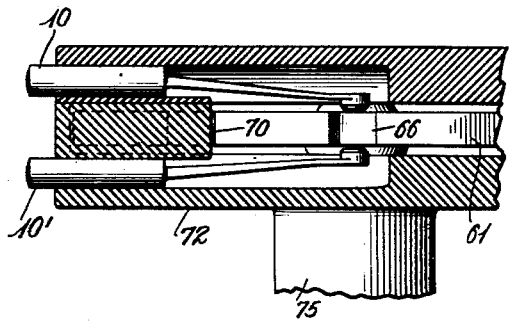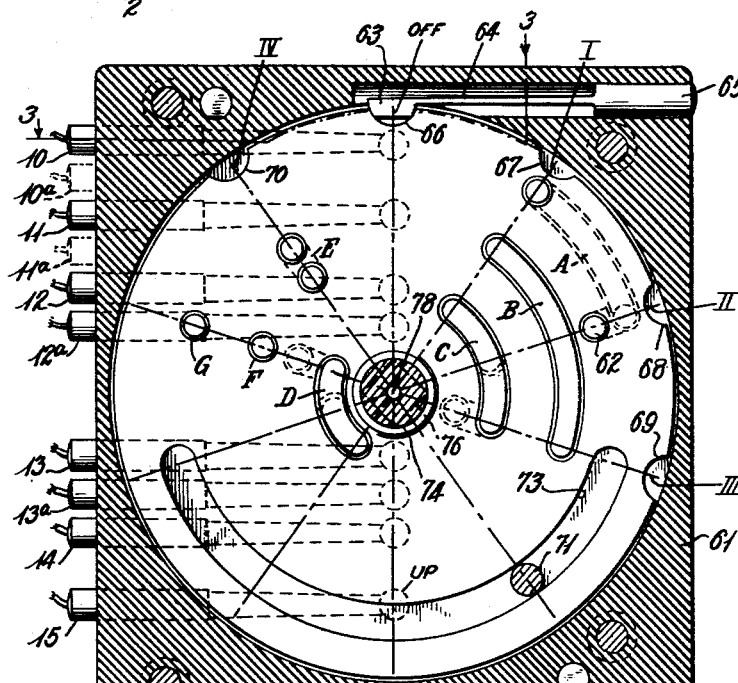

LIGHT CONTROL SYSTEM

Filed April 18, 1935  3 Sheets-Sheet 2

Inventor
Fred I. Getty

By Brown & Phelps
Attorney

Sept. 1, 1936.     F. I. GETTY     2,053,187
LIGHT CONTROL SYSTEM
Filed April 18, 1935     3 Sheets-Sheet 3
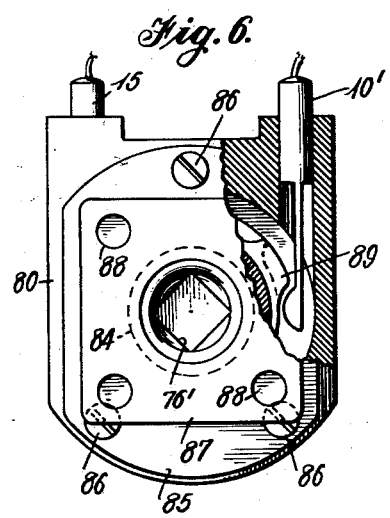
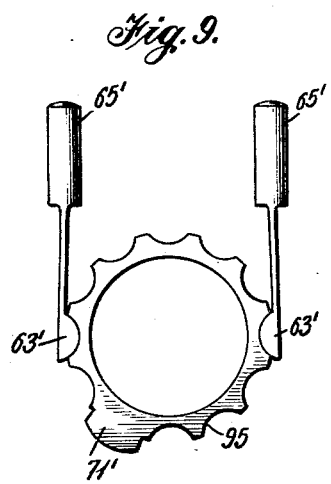
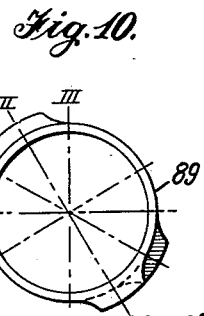
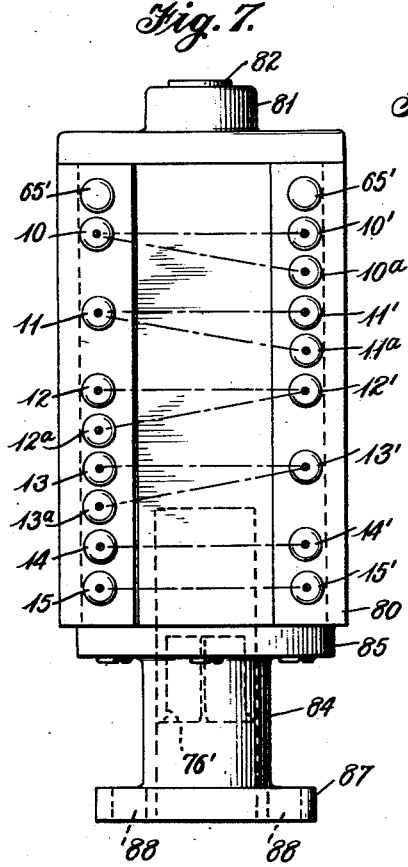
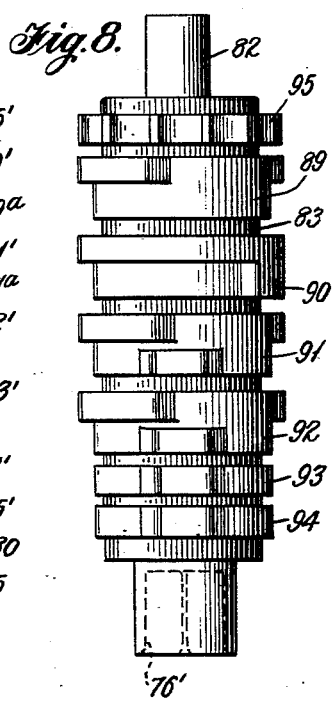
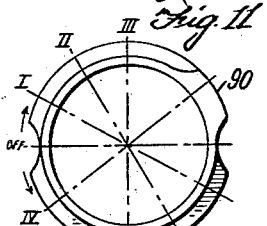
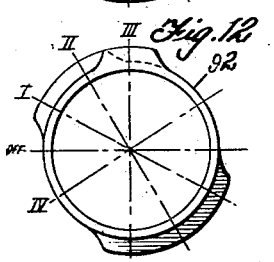
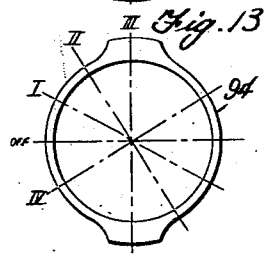
Inventor
Fred I. Getty
By Brown & Phelps
Attorneys Patented Sept. 1, 1936

2,053,187

UNITED STATES PATENT OFFICE 2,053,187

LIGHT CONTROL SYSTEM

Fred I. Getty, Jennings, La.

Application April 18, 1935, Serial No. 17,091

7 Claims. (Cl. 171—97)

The invention relates to control of the lighting of vehicles and has as an object the provision of a system of control enabling the display of three characters of lights either in sequence or in alternation between a choice of two of said lights.

It is an object of the invention to provide a mechanical switch to bring electro-magnetic switches into operation for said selective actuation under control of a single circuit closer.

It is a further object of the invention to provide control of the lights of a vehicle provided with lights of three characters as bright, tilt, or dim, whereby said lights may be displayed in sequence or whereby a choice of two as bright and dim, or tilt and dim, may be displayed in alternation upon successive operations of a single circuit closer.

It is a further object of the invention to provide a manually operated switch having a plurality of operative bridges to place the electromagnetic switches referred to into the desired connection with a circuit closer.

Further objects of the invention will appear from the following description when read in connection with the accompanying drawings showing an illustrative embodiment of the invention, and wherein:—

Fig. 1 is a plan view of a manual switch;

Fig. 2 is a vertical section on line 2—2 of Fig. 1;

Fig. 3 is a detail section on line 3—3 of Fig. 2;

Fig. 6 is an end view of a different form of manual switch;

Fig. 7 is a plan view of the structure of Fig. 6;
Fig. 8 is a plan view of the rotatable contact cylinder;

Fig. 9 is a detail end view of the locking pawl and ratchet arrangement; and

Figs. 10 to 13 inclusive are side views of the respective contact blocks.

Figure 5:
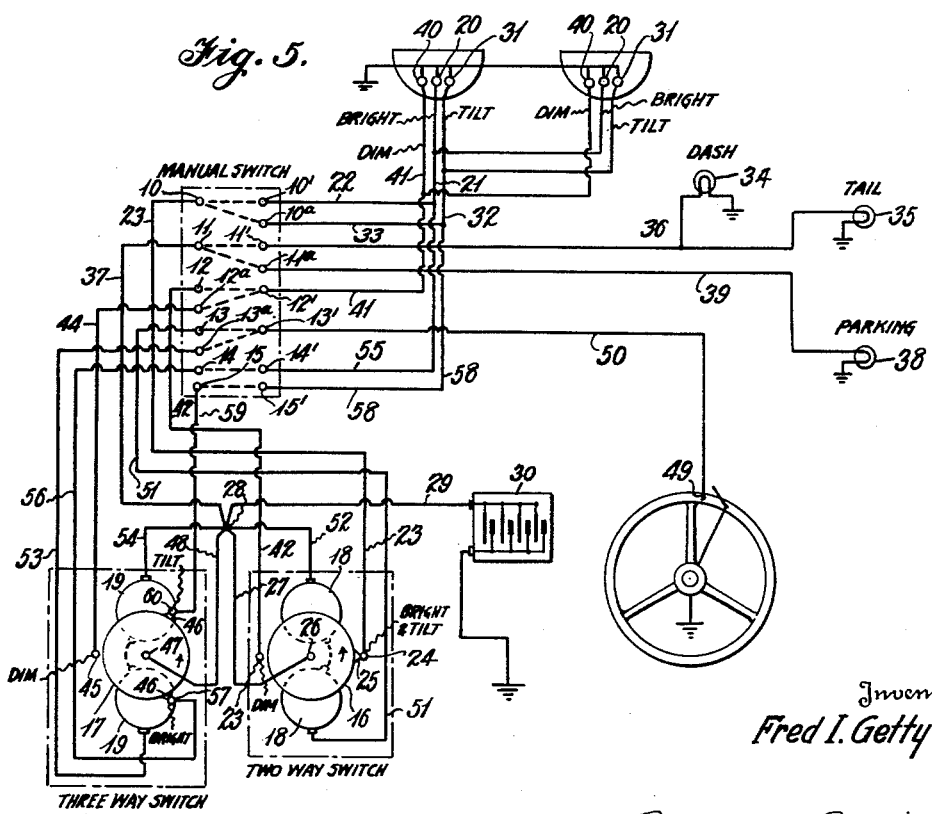
Fig. 5 is a diagram of circuits.

As shown in Fig. 5, the circuits are divided under control of the manual switch in a plurality of bridges. The lights as indicated in the head lamps diagrammatically shown as bright, tilt, and dim lights, are illustrated as three separate bulbs although it will be understood that in accordance with usual practice the bright and tilt lights may be separate filaments in a single bulb and the dim light may be a separate bulb.

For control of the lights as indicated at the left of Fig. 5, there are provided a plurality of bridges as follows: 10, 10a, 11, 11a, 12, 12a, 13, 13a, 14 and 15. The lights of the two head lights are shown as connected in parallel. Also at the lower left hand portion of Fig. 5, are shown two electromagnetic switches, a two-way switch at the right and a three-way switch at the left in the indicated portion of said figure.

These electro-magnetic switches each have a contact bearing disk—16 in the two-way switch and 17 in the three-way switch. The electromagnets 18 in the two-way switch and 19 in the three-way switch are to be understood as operating the disk 16, in the two-way switch, a half-revolution at each successive energization, and the disk 17 in the three-way switch a third of a revolution at each successive energization.

When bridge 10 is closed, a circuit is provided from bright lights 20, through wires 21, 22, bridge 10, wire 23, contact 24, contact 25 upon disk 16, central contact 26, wire 27, junction 28, wire 29, to battery 30 and thence to ground. When bridge 10a is closed, a circuit is provided from tilt lights 31, wires 32, 33, bridge 10a, and successively over wires 23, etc. to battery as formerly described.

When bridge 11 is closed, a circuit is provided from dash light 34 and tail light 35 by wire 36, bridge 11, wire 37 to junction 28 and thence to battery and ground. When bridge 11a is closed, the parking light 38 is provided with a circuit through wire 39, bridge 11a, and wire 37 to junction 28 and battery.

When bridge 12 is closed, there is provided a circuit from dim lights 40, over wire 41, bridge 12, wire 42 to contact 23, contact 25 when in proper position, central contact 26, wire 27 to junction 28 and battery.

When bridge 12a is closed, a circuit is provided from the dim lights over wire 41, to wire 44, to contact 45, contact 46 of disk 17 when in proper position, central contact 47 of disk 17, wire 48 to junction 28 and to battery.

When bridge 13 is closed, a circuit is provided to the circuit closer 49 shown diagrammatically as applied to the rim of a steering wheel, the other contact of which is shown as grounded, over wire 50, bridge 13, wire 51, to magnets 18 of the two-way switch, wire 52 to junction 28 and battery. When bridge 13a is closed, the circuit closer 49 is connected by wire 50, bridge 13a, wire 53, to magnets 19 of the three-way switch, wire 54 to junction 28 and to battery.

When the bridge 14 is closed, there is provided a circuit from bright lights 20, wire 55, bridge 14, wire 56, to contact 57, contact 46 when in proper position, central contact 47, wire 48 to battery.

When the bridge 15 is closed, a circuit is provided over wire 58, bridge 15, wire 59, to contact 60, contact 46 when in proper position, central contact 47, wire 48, to junction 28 and battery.

For convenience, the above bridges and the result of the closure thereof are scheduled as follows:

Bridge 10—bright to 2-way switch
Bridge 10a—tilt to 2-way switch
Bridge 11—tail and dash direct
Bridge 11a—parking direct
Bridge 12—dim to 2-way switch
Bridge 12a—dim to 3-way switch
Bridge 13—2-way switch magnet and circuit closer
Bridge 13a—3-way switch magnet and circuit closer
Bridge 14—bright to 3-way switch
Bridge 15—tilt to 3-way switch It will be noted that the separate lights in the head lamps, the dash lamp, the tail light and the parking light are all grounded to provide the return circuit to the battery.

Figure 4:
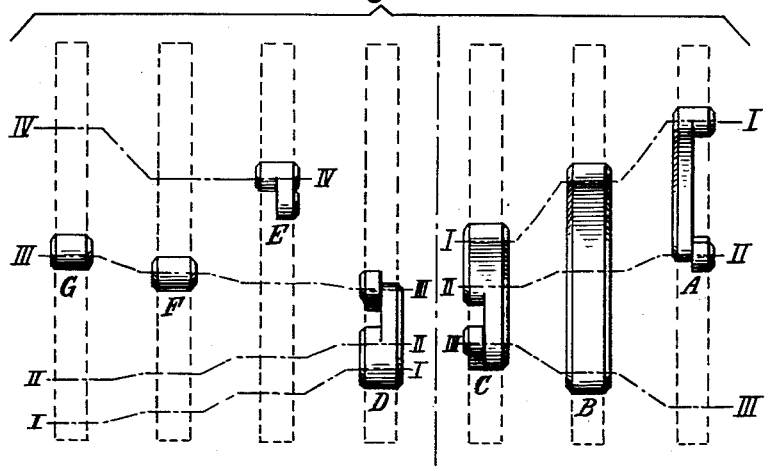
Fig. 4 is a collective view showing the contact blocks of the manual switch in side elevation and approximately in their relative positions occurring in the manual switch.

For closing of the respective bridges to provide the desired results, the manual switch, shown in Figures 1 to 4 inclusive, is provided. Figure 4 shows the form of contact blocks A, B, C, D, E, F, and G, which are respectively indicated in Fig. 2. To close the bridges in cooperation with the said blocks, there are shown brushes numbered to agree with the respective bridges in Figs. 1 and 2.

Brushes 10 will be bridged by block A and bridges 10 and 10a indicated in dotted lines in Fig. 2 will be closed by the block A contacting with the brush 10 at one side of the disk 61 and brush 10a by the offset 62 of block A.

The different positions of the switch are marked I, II, III, IV, the positions numbered I, II, and III being secured by a movement of the top of the disk seen in Fig. 3 to the left in said figure by successive steps, and position IV will be secured by movement of said portion of the disk to the right one step as seen in Fig. 2.

To locate the switch in the respective positions, there is shown a pawl 63 carried by resilient finger 64 mounted in block 65 adapted to seat itself in recess 66 in the off position, 67 in position I, in recess 68 in position II, in recess 69 in position III and in recess 70 in position IV.

To limit the extreme movement of the disk, there is shown a banking pin 71 fixed in the casing 72 of the manual switch projecting into an arcuate slot 73 formed in the disk and adapted to abut the ends of the slot at the extreme allowed movement of the disk.

In the different positions of the disk, the bridges will be closed in the following manner:

I closes bridges 10, 11, 12, and 13
II closes bridges 10a, 11, 12, and 13
III closes bridges 11, 12a, 13a, 14 and 15
IV closes bridges 11 and 11a.

It will be seen that in position I, bridges 10, 11, 12, and 13 will be closed whereby to connect the magnets of the two-way switch with the circuit closer 49 over the above described circuit and to also connect the bright light to one contact of the two-way switch, the dim light to the second contact of the two-way switch, and to connect the tail and dash lights direct without influence by circuit closer 49. Therefore upon successive operations of the circuit closer 49, the bright light and the dim light will be displayed in alternation, while the tail and dash light will be continuously shown.

In position II of the manual switch, the lights will be the same as in position I, except that the tilt light will be substituted for the bright light, bridge 10a being closed instead of bridge 10, and therefore the tilt light and the dim light will be displayed in alternation upon successive operations of the circuit closer 49.

In position III the magnets of the three-way switch will be connected to the circuit closer 49 of bridge 13a and over bridge 11, the tail and dash lights will be connected directly to battery, over bridge 12a the dim light will be placed into connection with contact 45 of the three-way switch, over bridges 14 and 15 respectively the contacts 46 and 57 will be connected to the tilt and bright lights respectively and over bridge 13a the magnets 19 of the three-way switch will be connected to the circuit closer 49 and therefore upon successive actuations of the circuit closer 49 the bright, tilt and dim lights will be shown in alternation.

In position IV of the switch, a circuit will be closed through the dash, tail and parking lights directly to battery. It will be understood that the circuit closer 49 may be located otherwise than upon the steering wheel, as for instance, in the floor of the automobile in a convenient position for operation by the foot of the driver.

The radial positions of the blocks A-G inclusive for the different positions of the switch are indicated by radial dotted lines on Fig. 2 and corresponding lines are shown upon Fig. 4 to indicate the positions of the blocks in the different positions of the disk 61.

The disk 61 is shown as carried by a stub shaft 74, shown as revoluble in a hollow projection 75 from the casing 72. A squared socket 76 is shown for reception of an actuating shaft having a squared end. The casing portion 75 is shown as formed with a flange 77 by means of which the switch casing may be secured to a flange, as for instance on the lower end of a steering wheel column. When so used the shaft 74 is desirably provided with a through passage 78 for passage of a horn wire.

The form of switch shown in Figures 6 to 10 inclusive comprises a housing 80 having a bearing 81 for the stub shaft 82 of the rotating block-carrying cylinder 83 and a bearing 84 for the remaining end of said cylinder formed in a cover plate 85 which may be secured to the housing 80 as by means of screws 86.

The cover plate 85 is shown as formed with a flange 87 provided with bolt holes 88 by which the switch may be secured as upon the end of a steering column.

Projecting into the housing 80 there is shown a plurality of brush-carrying pins 10, 10'—15, 15', which correspond to the like brushes of Figs. 1 to 3 inclusive.

The contact blocks 89—94 are shown as comprising rings having eminences thereon properly located and formed to establish the correct contacts with the brushes as the cylinder is revolved to the four positions indicated in dotted lines on Fig. 10, and as located by the pawls 63'. The operation is precisely the same as that of the form shown in Figs. 1 to 4 inclusive and will be understood from the description of the preceding form.

The ratchet ring 95 is shown as provided with a stop member 71' which will contact one of the pawls 63' at the limit of movement of revolution of the cylinder 83 in either direction.

For purpose of a diagrammatic showing, the electro-magnetic switches are shown as revolving the contact disks one-third and one-half revolution at each successive impulse. However, use is contemplated of magnetic switches of the character described and claimed in my copending application Serial No. 627,288, filed August 2, 1932, for Electric switch, wherein two circuits are alternated or three circuits closed in succession by less than one-half or one-third revolutions of the disks respectively.

Minor changes may be made in the physical embodiment of the invention within the scope of the appended claims without departing from the spirit thereof.

I claim:

1. Light control for vehicles provided with plural light equipment comprising, in combination: an electromagnetic switch having a plurality of contacts; a circuit closer; manual switch-means having a plurality of operative positions; and electrical connections placing different lights in circuit with said contacts in different positions of the manual switch-means, and said circuit closer in circuit with the magnets of the electromagnetic switch in each said position, whereby to display chosen different lights by successive actuations of said circuit closer.

2. Light control for vehicles provided with plural light equipment comprising, in combination: a switch having a plurality of contacts brought into action serially by successive actuations of the switch; switch-means having a plurality of operative positions; and electrical connections placing different lights in circuit with certain of the respective contacts of the first-named switch in different positions of said switch-means for display of a choice of different lights by successive actuations of said first named switch.

3. Light control for vehicles provided with plural light equipment comprising, in combination: an electromagnetic switch to cause display of either of two of said lights in alternation; a circuit closer to cause energization of the magnets of said switch; and switch means to place the circuit closer into circuit with the magnets of the switch and the two desired characters of head lights into circuit with contacts of the electromagnetic switch for alternate display.

4. Light control for vehicles provided with plural light equipment comprising, in combination: an electromagnetic switch to display said lights in sequence; an electromagnetic switch to display two of said lights in alternation; a circuit closer to energize the magnet of either of said switches; and switch means to place the circuit closer in circuit with the magnet of the desired switch and the desired character of lamp equipment into circuit with contacts of the chosen electromagnetic switch.

5. A light control system for vehicles equipped with a tail light and three character head lights comprising, in combination: an electromagnetic switch to display either of two of said headlights in alternation; a circuit closer to cause energization of the magnets of said switch; and switch means to connect the magnets of said switch with said circuit closer, a desired two of said lights with contacts of said electromagnetic switch and said tail light to battery with any choice of head lights.

6. A light control system for vehicles equipped with a tail light and three character head lights comprising, in combination: an electromagnetic switch to display said lights in sequence upon successive energizations; an electromagnetic switch to display a desired two of said lights in alternation upon successive energizations; a circuit closer; and switch means to connect each of said lights to respective contacts of the first named switch and the magnets thereof to the circuit closer, choices of two of said lights to the respective contacts of the second named switch and the magnets of the latter to the circit closer in other positions thereof and said tail light to battery in any of said positions.

7. Light control for vehicles provided with plural light equipment, comprising, in combination: a switch having a plurality of fixed contacts and a movable contact shiftable serially into contact with said first-named contacts by successive actuations of the switch; switch-means comprising a member movable to any one of a plurality of positions co-acting with a plurality of circuit closing elements in each of certain of said positions; and electrical connections between the respective lamps of a plural light equipment and said switch-means and between the latter and said first-named switch whereby successive actuation of the first-named switch causes serial illumination of chosen different lamps.

FRED I. GETTY.